United States Patent [19]
Nowak et al.

[11] Patent Number: 4,875,693
[45] Date of Patent: Oct. 24, 1989

[54] ARBOR ASSEMBLY

[75] Inventors: Ronald R. Nowak, North Royalton; Carl F. Cherko, Euclid, both of Ohio

[73] Assignee: Oerlikon Motch Corporation, Cleveland, Ohio

[21] Appl. No.: 238,578

[22] Filed: Aug. 31, 1988

[51] Int. Cl.⁴ .............................................. B23B 31/40
[52] U.S. Cl. .................... 279/2 R; 269/48.1; 279/1 L
[58] Field of Search ...................... 279/1 L, 2 R, 2 A; 269/48.1, 48.2, 48.3, 48.4

[56] References Cited

U.S. PATENT DOCUMENTS

| | | | |
|---|---|---|---|
| 3,131,946 | 5/1964 | Newhouser | 279/2 R |
| 3,456,955 | 7/1969 | Bruinsma | 279/2 |
| 3,517,939 | 6/1970 | Jaehn | 279/2 |
| 3,521,896 | 7/1970 | Matsumoto | 279/91 |
| 3,665,657 | 5/1972 | Lill | 269/48.1 X |
| 3,791,659 | 2/1974 | Hardin | 279/2 R |
| 3,876,214 | 4/1975 | Blanchard | 279/1 |
| 4,121,847 | 10/1978 | Morawski | 279/2 R |
| 4,201,394 | 5/1980 | Morawski | 279/2 |
| 4,540,187 | 9/1985 | Morawski et al. | 279/1 |
| 4,662,043 | 5/1987 | Stone et al. | 29/33 P |

FOREIGN PATENT DOCUMENTS 2309332 8/1973 Fed. Rep. of Germany ..... 269/48.1

Primary Examiner—Steven C. Bishop
Attorney, Agent, or Firm—Renner, Otto, Boisselle & Sklar

[57] ABSTRACT

Arbor assembly includes a fixed arbor section and a removable arbor section each including a pair of longitudinally spaced apart cylindrical pilot surfaces of different diameters spaced the same distance apart. Between the pilot surfaces on each arbor section is a guiding taper to aid in aligning the pilot surfaces so that such pilot surfaces freely engage each other during assembly. Longitudinally spaced locating tapers on the arbor sections are engageable by longitudinally spaced bearing surfaces on the workpiece for concentrically locating the workpiece between the arbor sections. A floating collet transmits a clamping force to the removable arbor section to urge the removable arbor section toward the fixed arbor section to clamp the workpiece between such arbor sections while the collet is in a free state without any flexing of the collet fingers. Upon release of the clamping force, the collet fingers are free to flex to permit the removable arbor section and workpiece to be assembled onto and removed from the fixed arbor section. A lost motion connection between the collet and fixed arbor section prevents removal of the collet during removal of the removable arbor section and workpiece from the fixed arbor section.

35 Claims, 4 Drawing Sheets

ARBOR ASSEMBLY

BACKGROUND OF THE INVENTION

This invention relates generally, as indicated, to an arbor assembly, and more particularly to an arbor assembly which greatly facilites concentrically locating and clamping a workpiece on a spindle center of a machine tool and subsequent removal therefrom.

Before a workpiece can be accurately machined on a machine tool, the workpiece must be concentrically oriented and securely clamped with respect to the spindle center of the machine tool. Various arbor and/or chuck assemblies have been designed for this purpose which have been met with varying degrees of success. However, there is a continuing need for a more effective way of concentrically locating a workpiece with respect to the spindle center. Also, there is a continuing need for a more effective way of applying a clamping force to the workpiece to maintain the workpiece in such concentric position without placing undue stresses on the clamping mechanism and still provide for easy assembly and disassembly of the workpiece from the arbor assembly.

SUMMARY OF THE INVENTION

In accordance with one aspect of the present invention, there is provided an arbor assembly including a fixed arbor section which may already be set up on the spindle center of a machine tool and a removable arbor section. Each arbor section includes two longitudinally spaced apart cylindrical pilot surfaces spaced the same distance apart so that the pilot surfaces on each arbor section will start to engage and disengage each other at the same time during assembly and disassembly of the removable arbor section with respect to the fixed arbor section.

In accordance with another aspect of the invention, a guiding taper is desirably provided between the pilot surfaces on each arbor section to aid in aligning such pilot surfaces so that they freely engage each other during assembly. Such guiding taper and pilot surfaces can be assembled very easily, which is particularly important where, as is the usual case, the loader that places the removable arbor section on the fixed arbor section has low positioning accuracy requiring the arbor assembly to assemble and disassemble as freely as possible.

Also in accordance with the invention, both arbor sections are desirably provided with opposed external locating tapers engageable by spaced apart internal tapered bearing surfaces on the workpiece for clamping of the workpiece between such arbor sections.

In accordance with another aspect of the invention, a floating collet is desirably provided for gripping the inner diameter of the removable arbor section and transmitting a clamping force thereto to force the removable arbor section toward the fixed arbor section to clamp the workpiece securely between such arbor sections, leaving a slight clearance space between the two guiding tapers on the arbor sections so as not to interfere with such clamping action.

In accordance with still another aspect of the invention, a spring cartridge is desirably used to apply the clamping force to the collet while the collet is in a free state without any flexing of the collet fingers.

Also in accordance with the invention, only when the clamping force is released are the collet fingers free to flex inwardly to permit the removable arbor section and workpiece to be assembled onto and removed from the fixed arbor section.

In accordance with yet another aspect of the invention, the inner end of the collet is desirably supported by a collet supporting spring so that the collet can float when a clamping force is applied thereto further to prevent any bending or flexing loads from being applied to the collet during clamping.

Also in accordance with the invention, a lost motion connection is desirably provided between the collet and fixed arbor section to prevent removal of the collet during removal of the removable arbor section and workpiece from the fixed arbor section.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
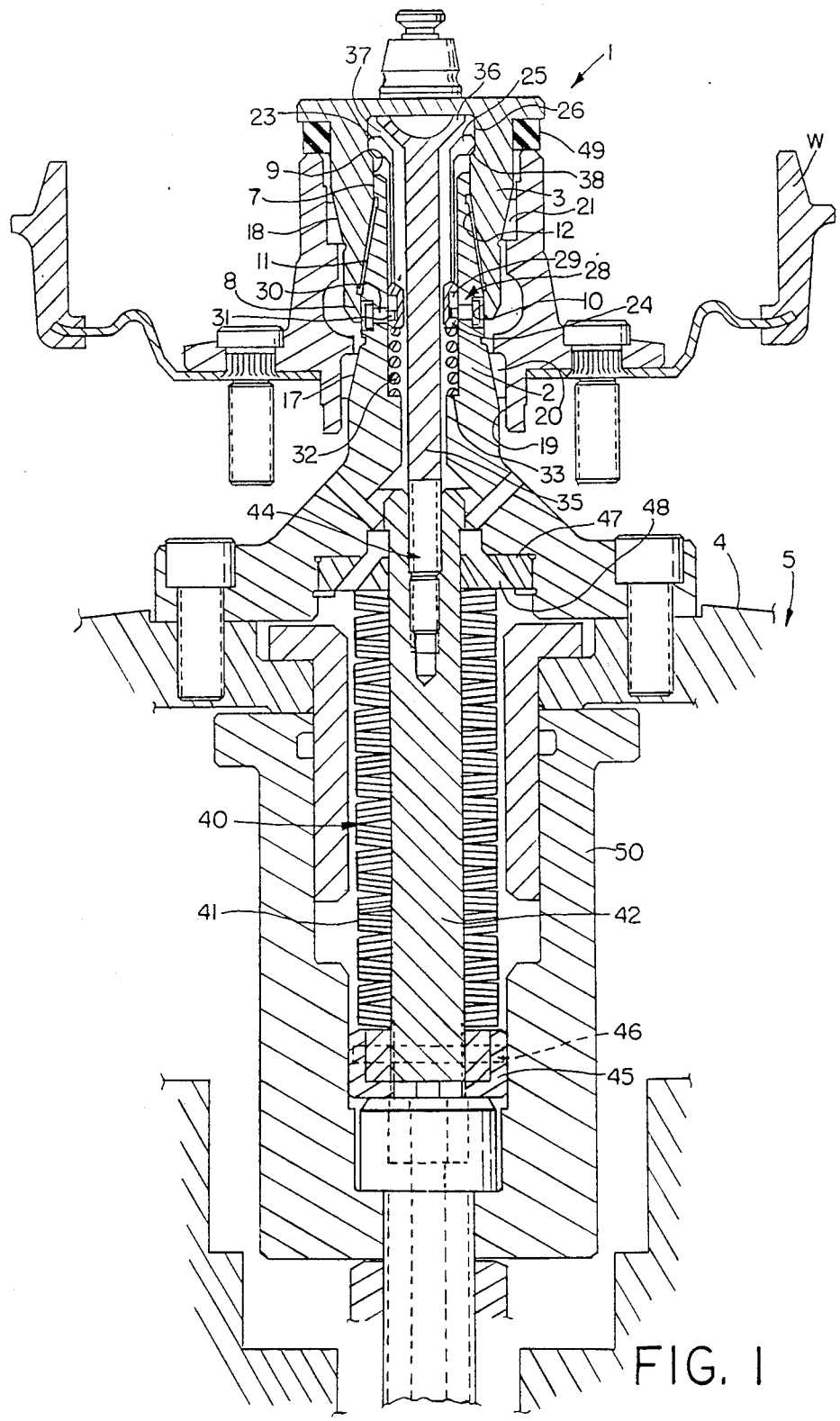
FIG. 1 is a fragmentary longitudinal section through a preferred form of arbor assembly in accordance with this invention shown in the unclamped position.
Figure 2:
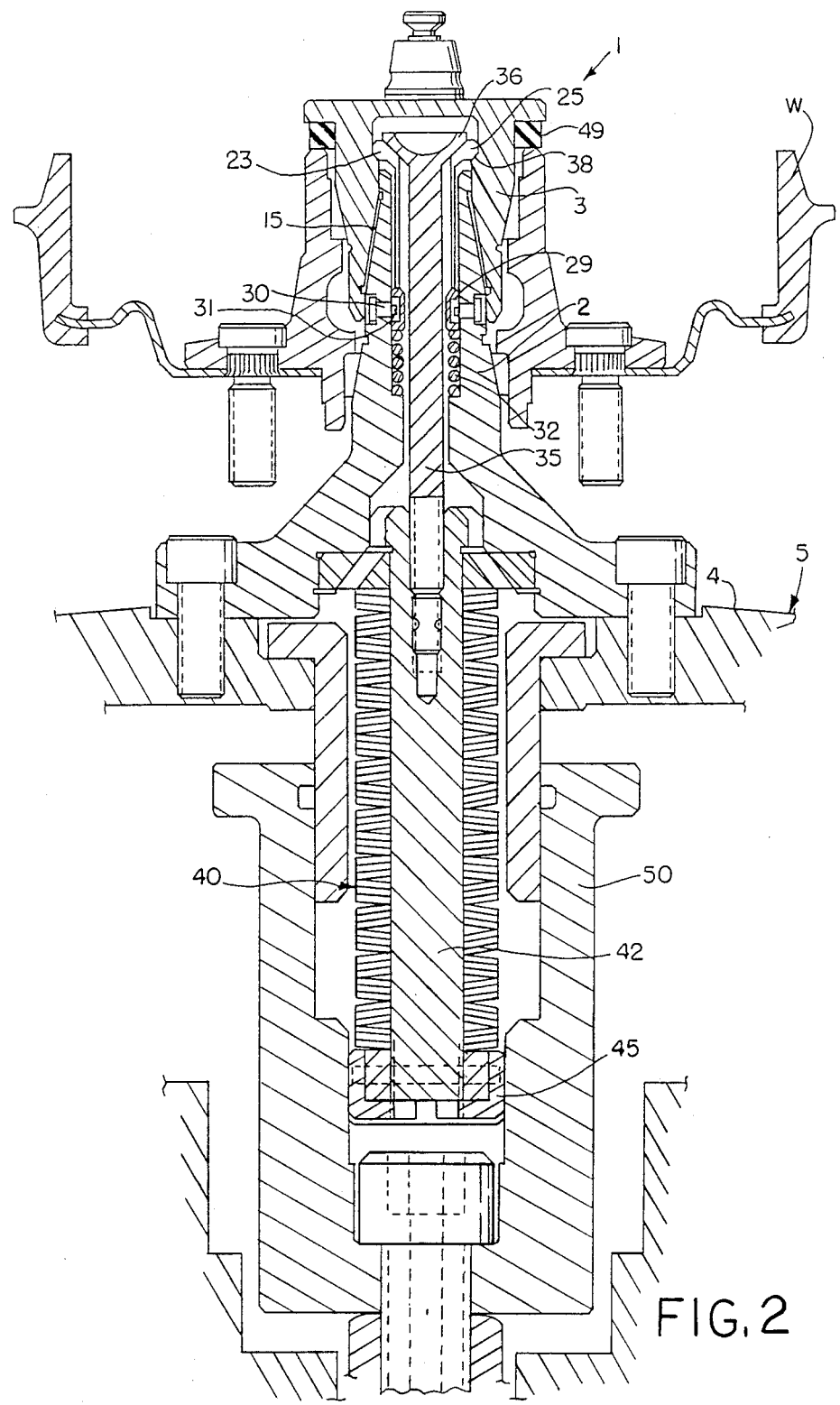
FIG. 2 is a fragmentary longitudinal section similar to FIG. 1 but showing the arbor assembly in the clamped position.

Referring now in detail to the drawings, and initially to FIGS. 1 and 2, there is shown a preferred form of arbor assembly 1 in accordance with this invention including a fixed arbor section 2 and a removable arbor section 3 receivable over the upper end of the fixed arbor section 2 in concentric relationship therewith for clamping of a workpiece W between such arbor sections 2, 3. FIG. 1 and the FIG. 3 enlargement show the arbor assembly in the unclamped position, whereas Fig. 2 and the FIG. 4 enlargement show the arbor assembly in the clamped position.

The fixed arbor section 2 may be bolted or otherwise secured to the upper face 4 of a compensating chuck 5 which is in turn suitably secured to a spindle of a machine tool used to machine the workpiece W. The fixed arbor section 2 and compensating chuck 5 are desirably located on the spindle center of the machine tool. Accordingly, by using the removable arbor section 3 to concentrically locate the workpiece W on the fixed arbor section 2 as described hereafter, the workpiece W will also be concentrically located on the spindle center.

Preferably, the removable arbor section 3 is concentrically located with respect to the fixed arbor section 2 by means of two matching sets of longitudinally spaced apart internal and external cylindrical pilot surfaces 7, 8 and 9, 10 which may but need not be of different diameters on the respective arbor sections 2, 3. Moreover, such pilot surfaces 7, 8 and 9, 10 on the respective arbor sections 2, 3 are desirably spaced the same distance apart so that the pilot surfaces on each arbor section will commence engaging and disengaging each other at the same time to assist the removable arbor section 3 in sliding freely on and off the fixed arbor section 2 for ease of assembly and disassembly of such arbor sections. Between the respective pilot surfaces 7, 8 and 9, 10 on each arbor section 2, 3 are guiding tapers 11 and 12 which aid in aligning the pilot surfaces during such assembly. Such guiding tapers and pilot surfaces can be assembled very easily, which is especially important in applications where, as is the usual case, the workpiece W and removable arbor section 3 are handled by a loader and unloader which are not very accurate in their positioning and removal functions.

Figure 4:
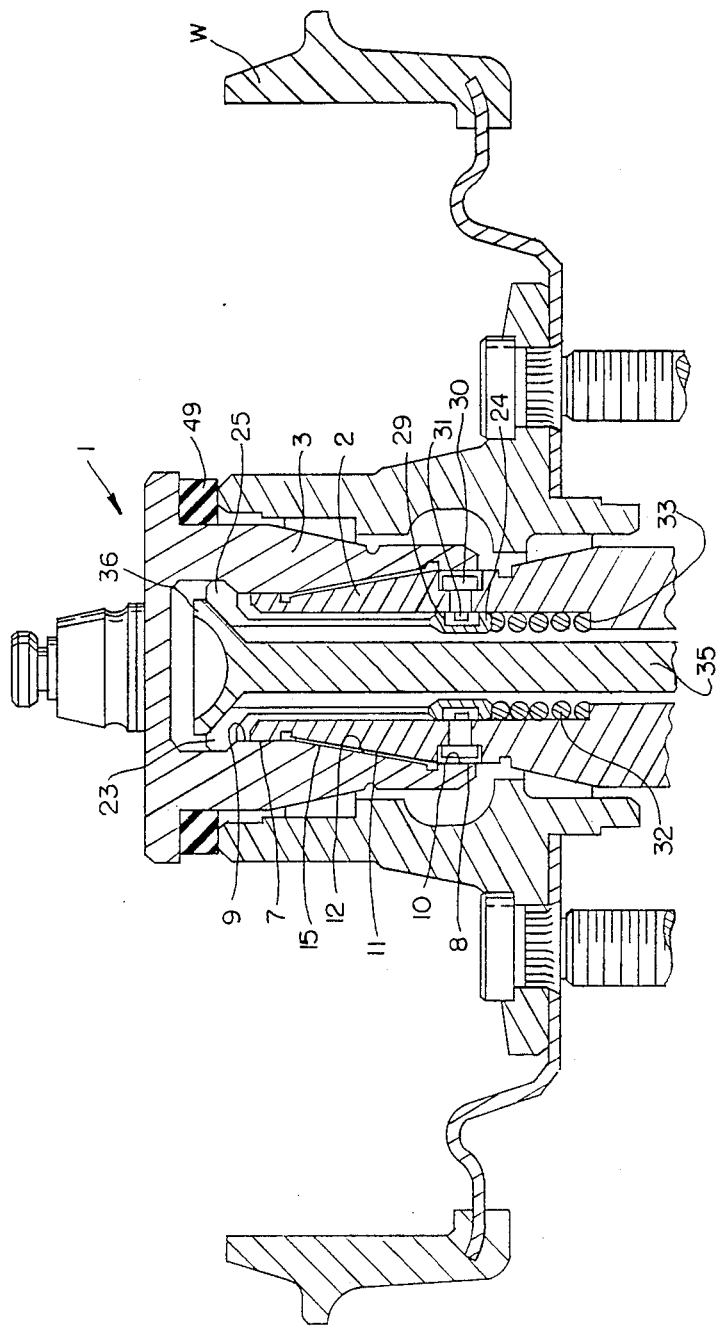

After the removable arbor section 3 has moved downwardly to clamp the workpiece W securely between the two arbor sections as illustrated in FIGS. 2 and 4, there is still a slight clearance taper (space) 15 between the two guiding tapers 11, 12 so as not to interfere with such clamping action.

The workpiece W must of course also be concentrically located with respect to the arbor sections 2, 3. To that end, both arbor sections 2, 3 are desirably provided with opposed, longitudinally spaced external locating tapers 17, 18. Also, the workpiece (in this case a drum) W has a stepped internal bore 19 therethrough with spaced apart tapered internal bearing surfaces 20, 21 that desirably closely match the respective external locating tapers 17, 18 on the arbor sections 2, 3 to support and clamp the workpiece W therebetween.

The required clamping force is transmitted to the removable arbor section 3 utilizing a floating collet 23 which has a collet sleeve 24 received within the axial outer end of the fixed arbor section 2 and extending axially outwardly therefrom with a plurality of circumferentially spaced collet fingers 25 extending radially outwardly from the protruding end thereof for receipt in an internal counterbore 26 within the removable arbor section 3 axially inwardly of the two internal pilot surfaces 9, 10 thereon.

Collet 23 is desirably free to float relative to the fixed arbor section 2 but may be retained against removal therefrom by means of a lost motion connection 28 therebetween. In the preferred embodiment disclosed herein, such lost motion connection 28 is formed by providing an external annular groove 29 in the collet sleeve 24 and one or more stop screws 30 extending radially through the fixed arbor section 2 into such groove. The axial length of the groove 29 is sufficiently greater than the outer diameter of the inner ends 31 of the stop screws 30 which are received in the groove 29 to permit a desired range of movement of the collet 23 relative to the fixed arbor section 2 while still preventing removal therefrom.

Preferably, collet 23 is supported within fixed arbor section 2 by a compression spring 32 interposed between the axial inner end of the collet sleeve 23 and an internal shoulder 33 in the fixed arbor section so that the collet 23 can float when a clamping force is applied to the collet to prevent any bending or flexing loads from being applied to the collet during clamping. The lost motion connection 28 will of course keep the collet 23 from popping out of the fixed arbor section 2 when the removable arbor section 3 and workpiece W are removed from the fixed arbor section 2.

The desired clamping forces may be transmitted to the collet fingers 25 by means of an actuating shaft 35 which extends coaxially through the center of the collet 23 and fixed arbor section 2. At the axial outer end of the actuating shaft 35 is an enlarged, tapered head portion 36 which partially radially overlaps the collet fingers 25. When the actuator shaft 35 is in it fully extended (raised) position shown in FIGS. 1 and 3, there is a clearance space 37 between the enlarged head portion 36 and collet fingers 25, whereby the collet fingers 25 are free to flex inwardly to permit the removable arbor section 3 to be freely inserted over the fixed arbor section 2 and removed therefrom. During such assembly and disassembly, there are no clamping forces to contend with. Accordingly, very little stress is applied to the collet fingers 25 during such assembly and disassembly.

After the removable arbor section 3 and workpiece W have been assembled onto the fixed arbor section 2, the enlarged head portion 36 of the actuating shaft 35 may be moved axially inwardly (downwardly) from the FIG. 1 (or 3) position to the FIG. 2 (or 4) position into engagement with the collet fingers 25 to trap the collet fingers 25 between the inner diameter (I.D.)of the removable arbor section 3 and enlarged head portion 36. Continued axial inward (downward) movement of the actuating shaft 35 causes the collet fingers 25 to apply an axial clamping force against an internal shoulder 38 on the removable arbor section 3 to clamp the workpiece W between the two arbor sections 2, 3 when the removable arbor section 3 is moved into the clamping position shown in FIG. 2 and 4 without any flexing of the collet fingers 25. Since there are no bending (flexing) loads applied to the collet 23 during clamping of the workpiece W between the arbor sections 2, 3, the useful life of the collet 23 is greatly increased. Only when the clamping pressure exerted by the enlarged head portion 36 of the actuating rod 35 is released are the collet fingers 25 free to flex inwardly to permit the removable arbor section 3 to be removed (and inserted over) the fixed arbor section 2. However, during this phase, there are no clamping forces to contend with.

The actual clamping force is desirably provided by a disc-spring cartridge 40 which, as shown, consists of a stack of spring-discs 41 slidably received on an acutating rod 42 having a threaded or other suitable connection 44 with actuating shaft 35. The disc-springs 41 may be retained on the actuating rod 42 by means of a nut 45 threaded onto the inner (lower) end of the rod 42 and secured in place as by means of a dowel pin 46 extending through the nut 45 and rod 42. At the outer (upper) end of the disc-spring cartridge 40 is a spacer 47 which may have suitable passages 48 therethrough to provide for an air blow-off of the arbor components to maintain cleanliness. The arbor assembly operates in a highly contaminated environment where cast iron machining is being performed. Any cast iron dust and chips entering the arbor assembly would degrade its accuracy in locating a workpiece, thus the need for air blow-off. Also, the blow-off air is desirably lubricated air which coats the internal arbor components with a film of lubricating oil insuring free operation. Also, a compressible foam seal 49 or the like may be attached to the removable arbor section 3 to provide for sealed engagement with the outer (upper) end of the fixed arbor section 2 as a further aid in keeping out cutting chips and the like.

Figure 3:
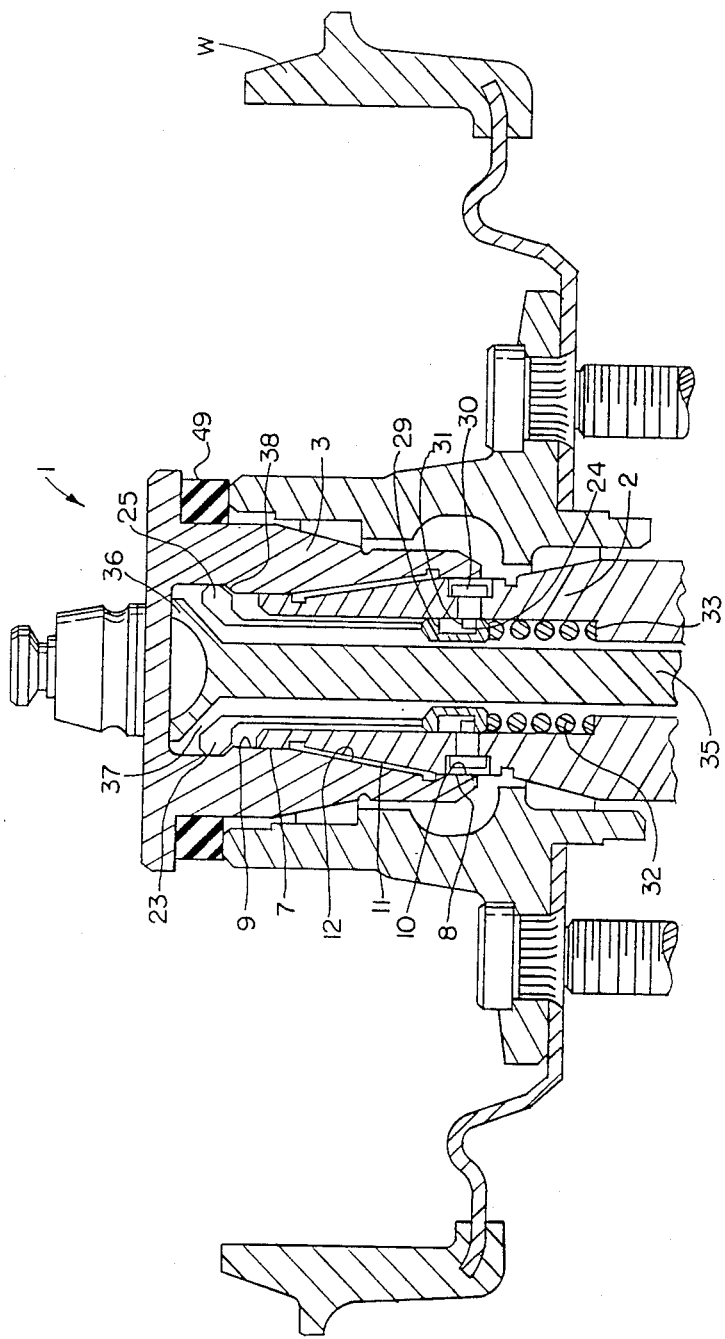
FIG. 3 and 4 are enlarged longitudinal sectional views of portions of the arbor assemblies of FIGS. 1 and 2, respectively.

The clamping force exerted on the collet 23 by the disc-spring cartridge 40 may be relieved by extending (raising) a chuck-jaw actuator 50 which acts against the bottom of the actuating rod 42 to compress the disc-springs 41 and move (raise) the enlarged end portion 36 of the actuating shaft 35 out of engagement with the collet fingers 25 as shown in FIGS. 1 and 3 so that the collet fingers 25 can flex inwardly during assembly of the removable collet section 3 and workpiece W onto the fixed collet section 2 and removal therefrom. Conversely, when the chuck-jaw actuator 50 is retracted (lowered), such downward movement of the chuck-jaw actuator 50 releases the spring cartridge 40 so that the disc-springs 41 are free to act on the rod 42 causing the rod 42 and shaft 35 to move downwardly to provide the desired arbor clamping force in the manner previously described. Such downward and upward movements of the chuck-jaw actuator 50 may in turn be transmitted to the chuck jaws (not shown) to cause the chuck jaws to move radially inwardly and outwardly into and out of clamping engagement with the exterior of the workpiece W. The chuck itself may be conventional and does not form any part of the present invention. However, the clamping of the exterior of the workpiece W by the chuck jaws reacts the machining forces thus allowing the workpiece W to be both roughened out and machine finished during a single clamping operation rather than two separate clamping operations.

From the foregoing, it will now be apparent that the arbor assembly of the present invention insures concentricity between the workpiece and spindle center and also effectively applies a clamping force to the workpiece to maintain the workpiece in the desired concentric relation utilizing a collet without placing undue stresses on the collet.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

We claim:

1. An arbor assembly comprising a first arbor section, a second arbor section removably mountable on said first arbor section, said arbor sections having matching sets of longitudinally spaced apart internal and external cylindrical pilot surfaces thereon for concentrically locating said second arbor section on said first arbor section, said pilot surfaces on said arbor sections being spaced apart the same distance so that said pilot surfaces on said arbor sections will start to engage each other at the same time during assembly of said second arbor section on said first arbor section, and means for concentrically locating and clamping a workpiece between said arbor sections.

2. The arbor assembly of claim 1 further comprising guiding taper means between said pilot surfaces on each said arbor sections to aid in aligning said pilot surfaces during such assembly.

3. The arbor assembly of claim 2 wherein there is a clearance space between said guiding taper means on said arbor sections when said workpiece is concentrically located and clamped between said arbor sections.

4. The arbor assembly of claim 1 wherein said means for concentrically locating said workpiece between said arbor sections comprises opposed longitudinally spaced locating tapers on said arbor sections engageable by longitudinally spaced bearing surfaces on said workpiece.

5. The arbor assembly of claim 4 wherein said bearing surfaces on said workpiece are tapered substantially to match the respective locating tapers on said arbor sections.

6. The arbor assembly of claim 5 further comprising guiding tapers between said pilot surfaces on each of said arbor sections to aid in aligning said pilot surfaces during such assembly, said guiding tapers having a clearance space therebetween when said bearing surfaces on said workpiece are in engagement with said longitudinally spaced locating tapers on said arbor sections and said workpiece is clamped between said arbor sections.

7. The arbor assembly of claim 1 wherein said means for clamping comprises collet means axially movable into and out of engagement with said second arbor section, and means for causing axial movement of said collet means into engagement with said second arbor section to urge said second arbor section axially toward said first arbor section to clamp said workpiece therebetween.

8. The arbor assembly of claim 7 wherein said collet means includes a plurality of circumferentially spaced collet fingers which radially overlap a stepped shoulder on said second arbor section for engagement therewith when said collet fingers are substantially unflexed, and said means for causing axial movement of said collet means into engagement with said second arbor section comprises an axially movable actuating shaft having an enlarged head portion which radially overlaps a portion of said collet fingers.

9. The arbor assembly of claim 8 wherein said enlarged head portion and stepped shoulder include means for trapping said collet fingers therebetween to prevent flexing of said collet fingers during axial movement of said enlarged head portion toward said collet fingers to apply an axial clamping force to said second arbor section to clamp said workpiece between said arbor sections.

10. The arbor assembly of claim 8 wherein said collet fingers are free to flex away from said stepped shoulder to permit assembly and removal of second arbor section from said first arbor section upon axial movement of said enlarged head portion out of clamping engagement with said collet fingers.

11. The arbor assembly of claim 7 further comrising spring means for supporting said collet means for axial movement relative to said first arbor section.

12. The arbor assembly of claim 7 further comprising lost motion connection means between first arbor section and said collet means for preventing removal of said collet means from said first arbor section while permitting relative movement therebetween.

13. The arbor assembly of claim 12 wherein said lost motion connection means comprises an annular groove in said collet means, and pin means extending from said first arbor section into said annular groove.

14. The arbor assembly of claim 13 wherein said annular groove has a sufficient axial length to permit the desired range of axial inward and outward movement of said collet means relative to said first arbor section while still preventing removal therefrom.

15. The arbor assembly of claim 8 further comprising spring means for urging said actuating shaft in a direction causing said enlarged head portion to apply the desired clamping force to said collet fingers.

16. The arbor assembly of claim 15 wherein said spring means comprises a spring cartridge operatively connected to said actuating shaft for urging said actuating shaft axially toward said first arbor section.

17. The arbor assembly of claim 16 further comprising an actuating rod connected to said actuating shaft, said spring cartridge comprising a plurality of disc-springs slidably received on said actuating rod, and nut means for retaining said disc-springs on said actuating rod.

18. The arbor assembly of claim 17 wherein said nut means is at the axial inner end of said spring cartridge, further comprising spacer means at the axial outer end of said spring cartridge for compressing said disc-springs between said spacer means and nut means.

19. The arbor assembly of claim 17 further comprising means for relieving such clamping force.

20. The arbor assembly of claim 19 wherein said means for relieving such clamping force comprises actuator means movable into and out of engagement with the axial inner end of said spring cartridge to compress said disc-springs and move said enlarged head portion of said actuating shaft axially away from said collet fingers.

21. The arbor assembly of claim 20 wherein said actuator means comprises a chuck-jaw actuator.

22. The arbor assembly of claim 1 further comprising passage means through said arbor assembly to allow for air blow-off of said arbor assembly to maintain cleanliness.

23. An arbor assembly comprising first and second arbor sections, means for concentrically locating said first arbor section with respect to said second arbor section, and means for concentrically locating and clamping a workpiece between said arbor sections, said means for clamping comprising axially movable collet means having a plurality of circumferentially spaced collet fingers engageable with said second arbor section, means for applying an axial clamping force to said collet means to cause said collet means to move axially for urging said second arbor section axially towards said first arbor section to clamp said workpiece therebetween, and means for preventing flexing of said collet fingers during such clamping of said workpiece between said arbor sections.

24. An arbor assembly comprising first and second arbor sections, means for concentrically locating said first arbor section with respect to said second arbor section, and means for concentrically locating and clamping a workpiece between said arbor sections, said means for clamping comprising collet means having a plurality of circumferentially spaced collet fingers engageable with said second arbor section, means for applying an axial clamping force to said collet means for urging said second arbor section axially towards said first arbor section to clamp said workpiece therebetween, and means for preventing flexing of said collet fingers during such clamping of said workpiece between said arbor sections, said means for preventing flexing of said collet fingers comprising an axially movable actuating shaft having an enlarged head portion which radially overlaps a portion of said collet fingers, and a stepped shoulder on said second arbor section for engagement by said collet fingers for trapping said collet fingers between said enlarged head portion and a stepped shoulder during axial movement of said actuating shaft toward said first arbor section.

25. The arbor assembly of claim 24 wherein said collet fingers are free to flex away from said stepped shoulder to permit assembly and disassembly of said second arbor section from said first arbor section upon movement of said enlarged head portion axially away from said collet fingers.

26. An arbor assembly comprising first and second arbor sections, means for concentrically locating said first arbor section with respect to said second arbor section, and means for concentrically locating and clamping a workpiece between said arbor sections, said means for clamping comprising collet means having a plurality of circumferentially spaced collet fingers engageable with said second arbor section, means for applying an axial clamping force to said collet means for urging said second arbor section axially towards said first arbor section to clamp said workpiece therebetween, means for preventing flexing of said collet fingers during such clamping of said workpiece between said arbor sections, and spring means for supporting said collet means for axial movement relative to said first arbor section.

27. An arbor assembly comprising first and second arbor sections, means for concentrically locating said first arbor section with respect to said second arbor section, and means for concentrically locating and clamping a workpiece between said arbor sections, said means for clamping comprising collet means having a plurality of circumferentially spaced collet fingers engageable with said second arbor section, means for applying an axial clamping force to said collet means for urging said second arbor section axially towards said first arbor section to clamp said workpiece therebetween, means for preventing flexing of said collet fingers during such clamping of said workpiece between said arbor sections, and lost motion connection means between said first arbor section and said collet means for preventing removal of said collet means from said first arbor section while permitting relative movement therebetween.

28. The arbor assembly of claim 27 wherein said lost motion connection means comprises annular groove means in said collet means, and pin means extending from said first arbor section into said annular groove means.

29. The arbor assembly of claim 28 wherein said annular groove means has an axial length sufficiently greater than the outer diameter of said pin means extending into said annular groove means to permit the desired range of axial movement of said collet means relative to said first arbor section while still preventing removal therefrom.

30. The arbor assembly of claim 24 further comprising spring means for urging said actuating shaft in a direction causing said enlarged head portion to apply a clamping force to said collet means.

31. The arbor assembly of claim 30 wherein said spring means comprises a spring cartridge operatively connected to said actuating shaft for urging said actuating shaft axially toward said first arbor section.

32. The arbor assembly of claim 31 further comprising an actuating rod threadedly connected to said actuating shaft, said spring cartridge comprising a plurality of disc-springs slidably received on said actuating rod, and nut means at the axial inner end of said actuating rod for retaining said disc-springs on said actuating rod.

33. The arbor assembly of claim 32 further comprising spacer means at the axial outer end of said spring cartridge for compressing said disc-springs between said spacer means and nut means.

34. The arbor assembly of claim 31 further comprising means for relieving said clamping force including actuator means movable into and out of engagement with the axial inner end of said spring cartridge to compress said disc-springs and move said enlarged head portion of said actuating shaft axially away from said collet fingers.

35. The arbor assembly of claim 34 wherein said actuator means comprises a chuck-jaw actuator.

* * * * *